US012321878B2

(12) United States Patent
Jain et al.

(10) Patent No.: US 12,321,878 B2
(45) Date of Patent: Jun. 3, 2025

(54) NET ZERO ACCELERATION FOR ORGANIZATIONS

(71) Applicant: International Business Machines Corporation, Armonk, NY (US)

(72) Inventors: Ayush Jain, Lucknow (IN); Jagabondhu Hazra, Bengaluru (IN); Manikandan Padmanaban, Chennai (IN); Ranjini Bangalore Guruprasad, Bengaluru (IN); Shantanu R. Godbole, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 18/179,789

(22) Filed: Mar. 7, 2023

(65) Prior Publication Data
US 2024/0303574 A1    Sep. 12, 2024

(51) Int. Cl.
*G06Q 10/0637* (2023.01)
*G06Q 10/0639* (2023.01)

(52) U.S. Cl.
CPC ... *G06Q 10/0637* (2013.01); *G06Q 10/06393* (2013.01)

(58) Field of Classification Search
CPC .............. G06Q 10/0637; G06Q 10/06393
See application file for complete search history.

(56) References Cited

U.S. PATENT DOCUMENTS

| 8,165,891 B2* | 4/2012 | Roberts | G06Q 50/184 705/1.1 |
| 2003/0023467 A1* | 1/2003 | Moldovan | G06Q 10/06 705/7.13 |
| 2008/0249965 A1* | 10/2008 | Pollack | G06Q 30/0603 705/413 |
| 2009/0177505 A1* | 7/2009 | Dietrich | G06Q 10/08 705/7.37 |
| 2009/0271229 A1* | 10/2009 | Saeed | G06Q 10/06 705/7.29 |

(Continued)

FOREIGN PATENT DOCUMENTS

KR    20100036554 A  *  4/2010

OTHER PUBLICATIONS

Kitsios et al. "A machine learning approach to rapidly project climate responses under a multitude of net-zero emission pathways" (2023) (https://www.nature.com/articles/s43247-023-01011-0) (Year: 2023).*

(Continued)

*Primary Examiner* — Sujay Koneru
(74) *Attorney, Agent, or Firm* — Yee & Associates, P.C.

(57) ABSTRACT

A computer implemented method identifies a set of environmental projects. A number of processor units identifies a group in a plurality of groups for organization of interest using organization parameters for the organization of interest. The number of processor units determines environmental performance for the organizations in the group using environmental data and the organization parameters for the organizations in the group. The number of processor units identifies the set of environmental projects for the organization of interest based on the environmental performance determined for the organizations in the group.

12 Claims, 11 Drawing Sheets

(56) References Cited

U.S. PATENT DOCUMENTS

| | | | | |
|---|---|---|---|---|
| 2011/0086928 | A1* | 4/2011 | Olah | C07C 29/15 |
| | | | | 585/329 |
| 2011/0119114 | A1* | 5/2011 | Singh | G06Q 10/0639 |
| | | | | 705/7.38 |
| 2014/0114867 | A1* | 4/2014 | Volkmann | G06Q 10/30 |
| | | | | 705/308 |
| 2020/0387812 | A1* | 12/2020 | Lewis | G06N 20/20 |
| 2022/0018029 | A1* | 1/2022 | McGinnis | C25B 3/25 |
| 2022/0101441 | A1* | 3/2022 | Stoner, Jr. | G06Q 40/06 |
| 2022/0138655 | A1 | 5/2022 | Kinai et al. | |
| 2022/0147876 | A1* | 5/2022 | Dalli | G06N 20/00 |

OTHER PUBLICATIONS

"Decarbonization Pathways Pilot," Massachusetts Clean Energy Center, Cohort 1 was open Jul. 15, 2022 to Jul. 31, 2022, Copyright 2022, accessed Mar. 6, 2023, 11 pages. https://www.masscec.com/program/decarbonization-pathways-pilot.

Close, "How to Digitally Accelerate the Journey to Net-Zero Value Chains," LinkedIn, Nov. 5, 2021, 6 pages. https://www.linkedin.com/pulse/how-digitally-accelerate-journey-net-zero-value-chains-karalee-close?trk=organization-update-content_share-articletrk=organization-update-content_share-article.

Heo et al., "Explainable AI-driven net-zero carbon roadmap for petrochemical industry considering stochastic scenarios of remotely sensed offshore wind energy," Journal of Cleaner Production, vol. 379, Part 2, Dec. 15, 2022, 6 pages. https://www.sciencedirect.com/science/article/abs/pii/S0959652622043657.

Jain et al., "Decarbonization Framework to Accelerate The Carbon Net-zero Pathway for Enterprises," IBM Corporation, INFORMS 2022, Oct. 16, 2022, 4 pages. https://research.IBM.com/publications/decarbonization-framework-to-accelerate-the-carbon-net-zero-pathway-for-enterprises.

Koh et al., "Decarbonising product supply chains: Design and development of an integrated evidence-based decision support system—the supply chain environmental analysis tool (SCEnAT)," International Journal of Production Research, Jan. 2012, 23 pages. https://www.tandfonline.com/doi/abs/10.1080/00207543.2012.705042.

Sun et al., "Using crowdsourced data to estimate the carbon footprints of global cities," Advances in Applied Energy, vol. 8, Dec. 2022, 9 pages. https://www.sciencedirect.com/science/article/pii/S2666792422000294.

* cited by examiner

NET ZERO ACCELERATION FOR ORGANIZATIONS

BACKGROUND

The disclosure relates generally to an improved computer system and more specifically to a method, apparatus, computer system, and computer program product that generates recommendations for reduced emissions generated by organizations.

Organizations are under pressure from investors, consumers, policymakers, and others to disclose greenhouse gas emissions generated by their activities. A greenhouse gas is a gas that absorbs and emits radio energies within a thermal infrared range causing a greenhouse effect. These greenhouse gas emissions include water vapor, carbon dioxide, methane, and nitrous oxide. A large focus in reducing greenhouse gas emissions is on carbon dioxide.

Further, organizations are also under pressure to commit to reducing these emissions to reach carbon neutrality. Carbon neutrality is a state in which net zero carbon dioxide emissions occur. Carbon neutrality can be reached by balancing emissions of carbon dioxide this removal or by limiting the emissions. Many large companies have set long-term net zero targets.

In working to meet these goals, organizations need technology to measure, track, and reduce emissions while building operational resiliency to the effects of climate change. Significant developments are present on measuring and tracking the carbon footprint on an organizational scale.

SUMMARY

According to one illustrative embodiment, a computer implemented method is provided. A number of processor units identifies a group in a plurality of groups for organization of interest using organization parameters for the organization of interest. The number of processor units determines environmental performance for the organizations in the group using environmental data and the organization parameters for the organizations in the group. The number of processor units identifies a set of environmental projects for the organization of interest based on the environmental performance determined for the organizations in the group. According to other illustrative embodiments, a computer system and a computer program product for identifying a set of environmental projects are provided. As a result, the illustrative embodiments identify environmental projects for recommendation to an organization with more accuracy by taking into account environmental performance for organizations identified as being related to the organization.

The illustrative embodiments also optionally identify a set of candidate environmental projects for the organization of interest based on the environmental performance determined for the organizations in the group and refine the set of candidate environmental projects for the organization of interest to reduce a negative impact on the environmental performance within a supply chain in which the organization of interest is located to form to form the set of environmental projects. As result, the illustrative embodiments can reduce the impact of environmental projects on other organizations within a supply chain in which the organization of interest is located.

The illustrative embodiments can also optionally determine environmental performance for organizations by determining high performance organization data for the organizations in the group that have the environmental performance that is equal to or greater than a threshold; determining low performance organization data for the organizations in the group that have the environmental performance that are less than the threshold; determining first impact scores for features that have high performance organization data and second impact scores for features that have low performance organization data; and determining salient features based on first impact scores, the second impact scores, the high organization performance data, and the low organization performance data. Thus, illustrative embodiments can more accurately identify environmental projects to recommend to an organization through analyzing environmental performance of different levels for organizations in a group of organizations identified as being related to the organization of interest.

Further, the list embodiments can optionally identify the set of environmental projects for the organization of interest based on the environmental performance determined for the organizations in the group and constraints for the organization of interest. As result, the illustrative embodiments can select environmental projects that are tailored to the organization of interest through considering constraints specific to the organization of interest.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
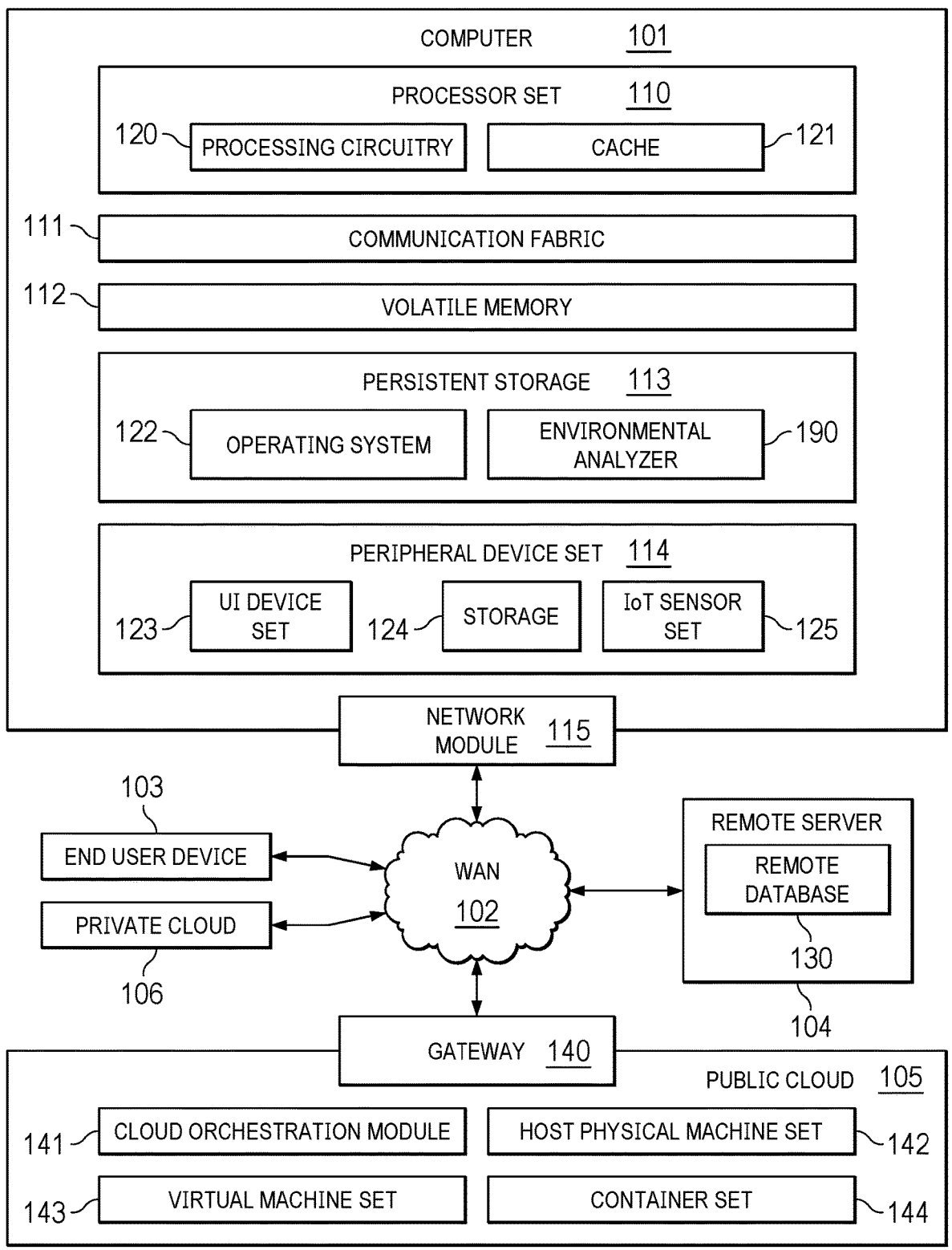
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as environmental analyzer 190. In addition to environmental analyzer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and environmental analyzer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in environmental analyzer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in environmental analyzer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. Very little focus is present on how to systematically reduce emissions at an organizational level. The illustrative embodiments recognize and take into account that many organizations do not have activity data regarding their operations. As a result, monitoring measuring, analyzing and acting to decarbonize their operations can be difficult. Many organizations do not take into account the environmental effects on their supply chains. Even when supply chains are considered, the data needed to measure and analyze carbon generation by organizations within the supply chain is often not available.

The illustrative embodiments also recognize and take into account that analyzing similar organizations can provide an opportunity to define and implement environmental projects to reduce the carbon footprint and move towards a carbon neutral state for the organization being analyzed for improvement. Further, analyzing the same or similar supply chains can also be helpful to implement environmental projects. In other words, the analysis can be made on the effect that environmental projects implemented by an organization has on a supply chain in which the organization is located.

Thus, the illustrative embodiments provide a method, apparatus, computer system, and computer program product for determining environmental projects to improve the environmental performance of organizations. The different illustrative examples can be used to help an organization move towards improved environmental performance such as carbon net zero. In one illustrative example, a group in a plurality of groups is identified for an organization of interest using organization parameters for the organization of interest. Environmental performance is identified for the organizations in the group using environmental data and the organization parameters for the organizations in the group. A set of environmental projects for the organization of interest is identified based on the environmental performance determined for the organizations in the group. In this example, the identification of environmental projects for the organization of interest can also take into account the effect of those environmental projects on other organizations in a supply chain in which the organization of interest is located.

Figure 2:
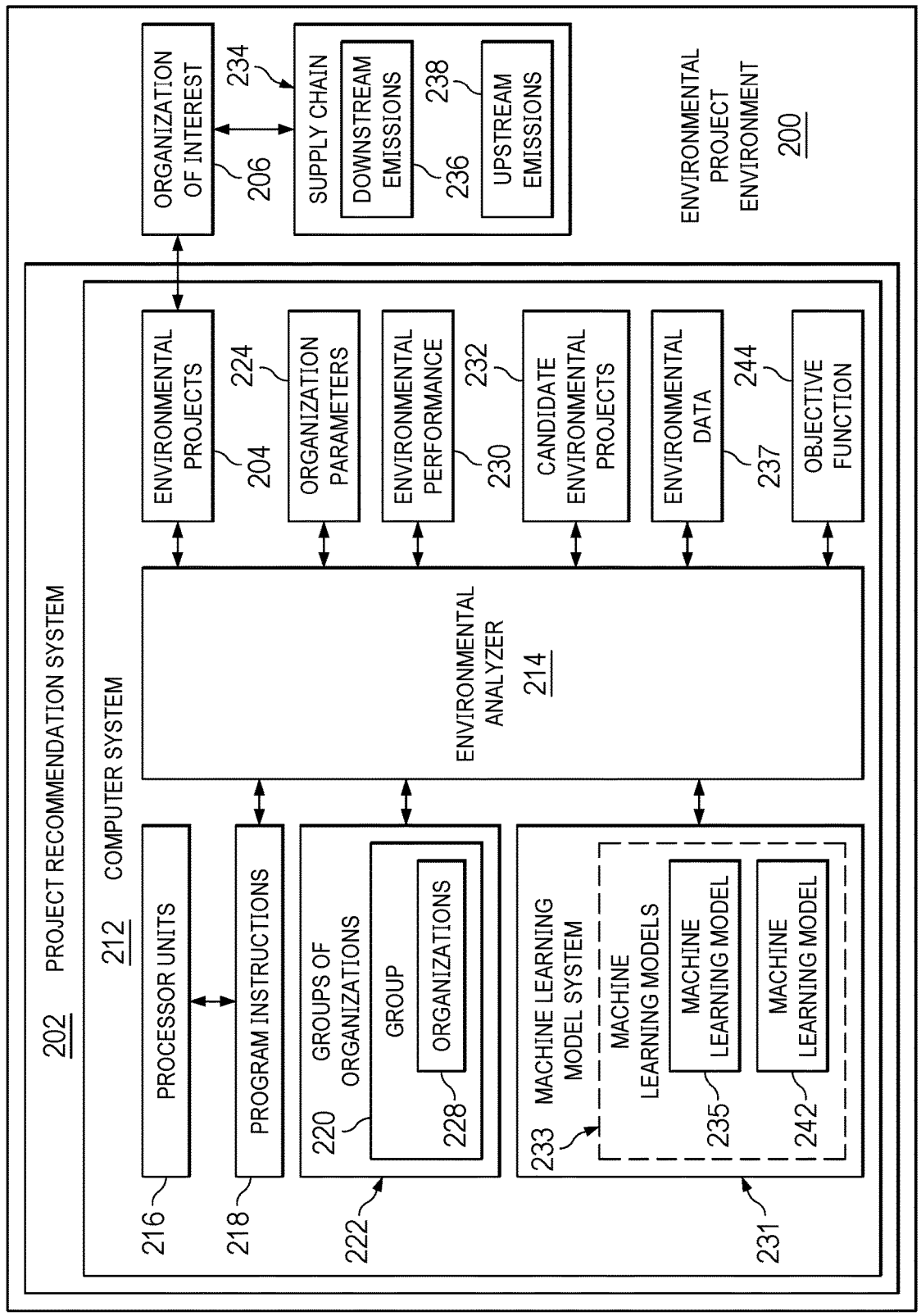
FIG. 2 is a block diagram of an environmental project environment in accordance with an illustrative embodiment.

With reference now to FIG. 2, a block diagram of an environmental project environment is depicted in accordance with an illustrative embodiment. In this illustrative example, environmental project environment 200 includes components that can be implemented in hardware such as the hardware shown in computing environment 100 in FIG. 1.

In this illustrative example, project recommendation system 202 can operate to recommend a set of environmental projects 204 to organization of interest 206. As used herein, a "set of" when used with reference to items means one or more items. For example, a set of environmental projects 204 is one or more of environmental projects 204.

Organization of interest 206 is an organization for which one or more of environmental projects 204 can be identified and recommended. Organization of interest 206 can take a number of different forms. For example, organization of interest 206 can be selected from at least one of a company, a corporation, a cooperative, an enterprise, a partnership, a limited partnership, a limited liability company, a nonprofit institution, an unincorporated enterprise, a for-profit organization, a government agency, a city, and other types of organizations.

Environmental analyzer 214 can be implemented in software, hardware, firmware or a combination thereof. When software is used, the operations performed by environmental analyzer 214 can be implemented in program instructions configured to run on hardware, such as a processor unit. When firmware is used, the operations performed by environmental analyzer 214 can be implemented in program instructions and data and stored in persistent memory to run on a processor unit. When hardware is employed, the hardware can include circuits that operate to perform the operations in environmental analyzer 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are on the same computer or on different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, environmental analyzer 214 identifies group 220 in groups of organizations 222 for organization of interest 206 using organization parameters 224 for organization of interest 206. In this illustrative example, organization parameters 224 can be selected from at least one of a geography, a sector, a number of employees, equipment, capitalization, and other parameters for organization of interest 206. In this example, group 220 can be identified for organization of interest 206 based on comparing and identifying similarities between organization parameters 224 for organization of interest 206 in organizations 228.

Environmental analyzer 214 determines environmental performance 230 for organizations 228 in group 220 using environmental data 237 and organization parameters 224 for organizations 228 in group 220. Environmental data can include data about emissions, cost avoidance projects, renewable energy projects, conservation projects, and other types of data. Environmental analyzer 214 identifies a set of environmental projects 204 for organization of interest 206 based on environmental performance 230 determined for the organizations 228 in group 220.

In this example, in identifying the set of environmental projects 204, environmental analyzer 214 identifies a set of candidate environmental projects 232 for organization of interest 206. In this example, the set of candidate environmental projects are based on environmental performance 230 determined for organizations 228 in group 220. Environmental analyzer 214 can refine the set of candidate environmental projects 232 for the organization of interest 206 to reduce a negative impact on environmental performance 230 within supply chain 234 in which organization of interest 206 is located to form to form the set of candidate environmental projects 232. Refining the set of candidate environmental projects 232 results in the set of environmental projects 204.

For example, environmental analyzer 214 models upstream emissions 238 and downstream emissions 236 in supply chain 234 caused by the set of candidate environmental projects 232. This modeling can be performed any number different ways. For example, environmental analyzer 214 can use at least one of machine learning model 242, objective function 244, or some other system or technique to model emissions within supply chain 234.

In this example, environmental analyzer 214 determines environmental performance 230 from predictions made using machine learning model system 231. Machine learning model system 231 comprises machine learning models 233. A machine learning model in machine learning models 233 is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms. Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

In this example, machine learning model 235 in machine learning models 233 is trained to make predictions of environmental performance 230 for organizations 228 in group 220. These emissions can be used to analyze the performance of organizations 228 in group 220 to determine environmental performance 230 for these organizations. These emissions can also be used to analyze environmental performance 230 for organization of interest 206. Further, machine learning model 235 or another machine learning model such as machine learning model 242 can be trained to determine the environmental impact of candidate environmental projects 232 on supply chain 234. This information can be used to select environmental projects 204 while reducing the impact within organization of interest 206 and within other organizations in supply chain 234.

Thus, in this illustrative example, environmental analyzer 214 can determine a set of environmental projects 204 using similar organizations to organization of interest 206 and can also take into account the effect of the set of environmental projects 204 for organization of interest 206 and for supply chain 234. As result, the set of environmental projects 204 can be determined for organization of interest 206 more accurately through using environmental performance 230 of organizations 228 that are considered to be in the same group as organization of interest 206.

As described above, this grouping of organizations 228 into group 220 with organization of interest 206 can be determined through analyzing organization parameters 224 for organizations 228 and organization of interest 206. Additionally, the selection environmental projects 204 can be made in a manner that reduces the impact on organizations within supply chain 234. In this manner, the selection of environmental projects 204 can take into account the impact of environmental projects 204 on organization of interest 206 and other organizations in supply chain 234.

Figure 3:
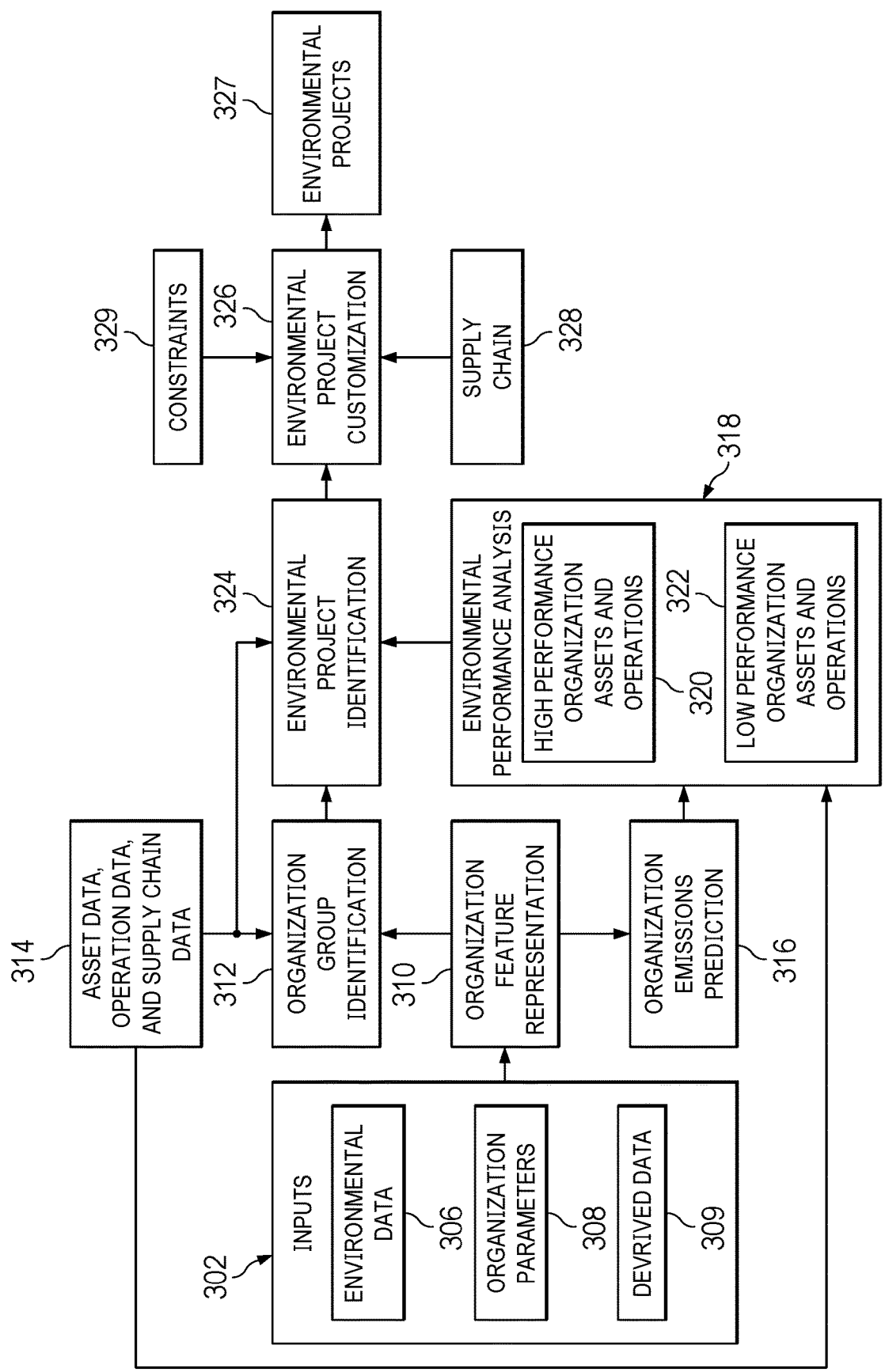
FIG. 3 is a data flow diagram for identifying environmental projects for an organization of interest in accordance with an illustrative embodiment.

With reference next to FIG. 3, a data flow diagram for identifying environmental projects for an organization of interest is depicted in accordance with an illustrative embodiment. In this illustrative example, inputs 302 are received for use in identifying environmental projects for an organization. In this example, the environmental projects can be identified for organizations such as organization of interest 206 in FIG. 2. The processing of data as described in this dataflow can be implemented in environmental analyzer 214 in FIG. 2.

Inputs 302 can be obtained from many different sources. These sources can include at least one of data from the organization of interest, crowd sourced environmental performance data for similar organizations, environmental reports from government agencies, and other sources.

In the illustrative example, inputs 302 comprises environmental data 306, organization parameters 308, and derived data 309. This data in inputs 302 can be from various sources. Inputs 302 can be obtained from various sources such as environmental reports. These environmental reports can include, for example, carbon disclosure project (CDP) reports, Sustainability Accounting Standards Board (SAAB) reports, Task Force on Climate-related Financial Disclosures (TCFDs), and other reports and sources of environmental information. Additionally, other data can be obtained from websites for the organizations as well as other sources. This data can be obtained for different organizations and can also include the organization of interest that is being evaluated for environmental projects.

In this example, environmental data 306 can include information about the effects on the environment and projects describing activities and operations for organizations. Environmental data 306 can be, for example, greenhouse gas (GHG) emissions, conservation projects, cost avoidance projects, renewable energy projects.

Organization parameters 308 are information about the organizations. For example, organization parameters 308 can include geography, country, sector, number of employees, and other parameters for the organizations.

In this example, derived data can be data based on other information in inputs 302. For example, derived data can include weather data. This weather data can be identified based on the identification of locations where organizations have operations in organization parameters 308. Further, weather data identified from different time periods can be selected to correspond with the time periods or other data in inputs 302.

These inputs can be processed and combined to form organization feature representation 310. This representation is all of the data identified and organized for the organizations. For example, environmental data 306, organization parameters 308, and derived data 309 can be organized by organizations. Further, this data can also be grouped by geography. Additionally, organization parameters 308 and organization feature representation 310 can be associated with environmental data 306 that includes environmental projects for the different organizations.

Organization group identification 312 identifies groupings of organizations. Additionally, the organization of interest that is being evaluated can also be associated with one of these groups as part of organization group identification 312. This grouping identified using at least some of the information in organization feature representation 310. For example, organization parameters 308 can be used in organization feature representation 310. Additionally, asset data, operation data, and supply chain data 314 can also be used in determining organization group identification 312. The asset data can be equipment, land, buildings, and other assets for the organizations. Operation data can identify the different operations performed by the organizations. Supply chain data identifies the supply chain in which different organizations are located.

The grouping of organizations into groups by organization group identification 312 can be performed using a clustering process or model. The clustering model can be a machine learning model in these illustrative examples.

Organization emissions prediction 316 use organization feature representation 310 to predict emissions from organizations. In this example, these predictions are for the organizations. The predictions made by organization emissions prediction 316 can be made using a machine learning model trained using at least some of the data in organization feature representation 310. For example, prediction of organization emissions can include a prediction of emissions based on features from organization feature representation 310 such as renewable energy or travel costs for organizations.

In this example, environmental performance analysis 318 is an analysis that can be performed for the performance of different organizations with respect to emissions for different features of the organizations. These features can be, for example, renewable energy, travel costs, and other features in organization feature representation 310.

This analysis takes into account the different operations assets of the organizations. For example, the environmental performance of a refining process for an organization such as refinery can be rated based on the prediction of emissions for those operations in prediction of organization emissions. The environmental performance of assets such as a refrigeration unit for a supermarket or servers for a data center can be analyzed with respect to the predicted emissions for those assets in prediction of organization emissions.

Environmental performance analysis 318 can include identification of high performance organization assets and operations 320 and low performance organization assets and operations 322. These identifications can be made based on comparisons of emissions for operations and assets between organizations in a group. For example, with respect to greenhouse gases generated by servers for data centers, a high performance organization asset can be servers that are ranked in the top 10 for environmental performance. As another example, low performance organization assets and operations can be refrigeration units used by a supermarket that ranks in the top 25 percentile of supermarkets for emissions from refrigeration units.

In other examples, the determination of whether high performance or low performance is present for an asset or operation in a group of organizations can be determined based on thresholds for emissions generated by those assets or processes. For example, high performance organization assets and operations 320 can be assets operations for organizations that have a net zero carbon emissions. Other organizations not having a net zero carbon emissions can be considered as having low performance organization assets and operations. In this example, normalized emissions are estimated for use in determining environmental performance. These emissions are used to determine the environmental performance. For example, emission per square foot for buildings, or server emissions per workload are some types of emissions that can obtained from various source such as lifecycle assessment (LCA) databases.

A lifecycle assessment (LCA) database contains information about the environmental impact of items such as a product, and material, the process, or other measurable activity over the lifecycle of these items. This database can include information performed during the lifecycle assessment of these items. For example, this type of database can include information about the environmental impact for different stages such raw materials, manufacturing, distribution, and final disposal of products or materials for the items.

This database can be created using lifecycle assessments, which is a standardized science-based tool for quantifying the impact in order to assess a lifetime environmental impact. For example, the lifecycle assessment database can include impact on at least one of greenhouse gas emissions, ozone depletion, eutrophication, impact on human health, or other impacts.

A granularity of performance evaluation can be made for particular types of assets in addition to organizations as a whole. For example, evaluation of environmental performance can be present for individual assets such as refrigeration units, servers, refining processes, or other assets. These assets and processes can be referred to as features.

Environmental project identification 324 identifies one or more environmental projects that can be considered for implementation by the organization of interest being analyzed. In this example, the identification of environmental projects can be made based on features for the same group as the organization of interest that have a high performance in which the impact of these features on the environmental performance is also high relative to other features analyze for the organizations. For example, a feature identified to be an important or salient feature is renewable energy. The organizations that use renewable energy have a higher environmental performance as compared to organizations that do not use renewable energy. As a result, renewable energy is a feature of organizations having high performance organization assets and operations 320.

An environmental project can be created from the feature of renewable energy. For example, an environmental project can be for the organization of interest to use renewable energy. If the organization of interest already uses renewable energy, the environmental project can be to increase the use of renewable energy to some selected amount based on the analysis of the environmental performance of other organizations in the group using renewable energy, how much renewable energy these organizations use, and the impact on environmental performance based on the amount of renewable energy used.

Environmental project customization 326 selects a set of environmental projects 327 for the organization of interest that includes customizations or changes for that organization. For example, environmental project customization 326 can take into account constraints 329.

An example of a constraint can be a cost constraint. For example, environmental project may suggest purchasing new equipment X to obtain lower emissions. However, cost constraints may make environmental project for purchasing new equipment X as one that project that cannot be implemented based on the cost constraints. Instead, a customization to the environmental project may be made to purchase new equipment Y which may have slightly higher emissions than new equipment acts but has lower emissions than current equipment used by the organization. As another example, all of the changes to a refining process as specified in environmental project may not be possible based on particular regulations in a geographic location. As a result, the environmental project can be modified to meet the regulations.

Further, the customization of environmental projects in environmental project customization 326 can include taking into account supply chain 328 for the organization of interest. In this example, supply chain 328 can be taken into account to determine the effects of suggested environmental projects to organizations upstream and downstream of the organization of interest in supply chain 328.

For example, with an environmental project of purchasing renewable energy, the impact of purchasing renewable energy by organizations in the supply chain can be made to determine whether the use of renewable energy affects supplies upstream or downstream in supply chain 328. This determination can be made using a lifecycle assessment (LCA) database and a supply chain wrath identifying organizations in supply chain 328.

The result of environmental project customization 326 is a set of environmental projects 327. This set of environmental projects 327 is an example of environmental projects 204 and FIG. 2 that can be recommended. Further, environmental analyzer 214 can save the set of environmental projects 327 in a storage system. Environmental analyzer 214 can automatically send the set of environmental projects 327 stored in the storage system to an end use device over a network in response to an event relating to the set of environmental projects. The event can be a request from an analysis, an update to environmental data, or other events relating to the set of environmental projects 327.

Figure 4:
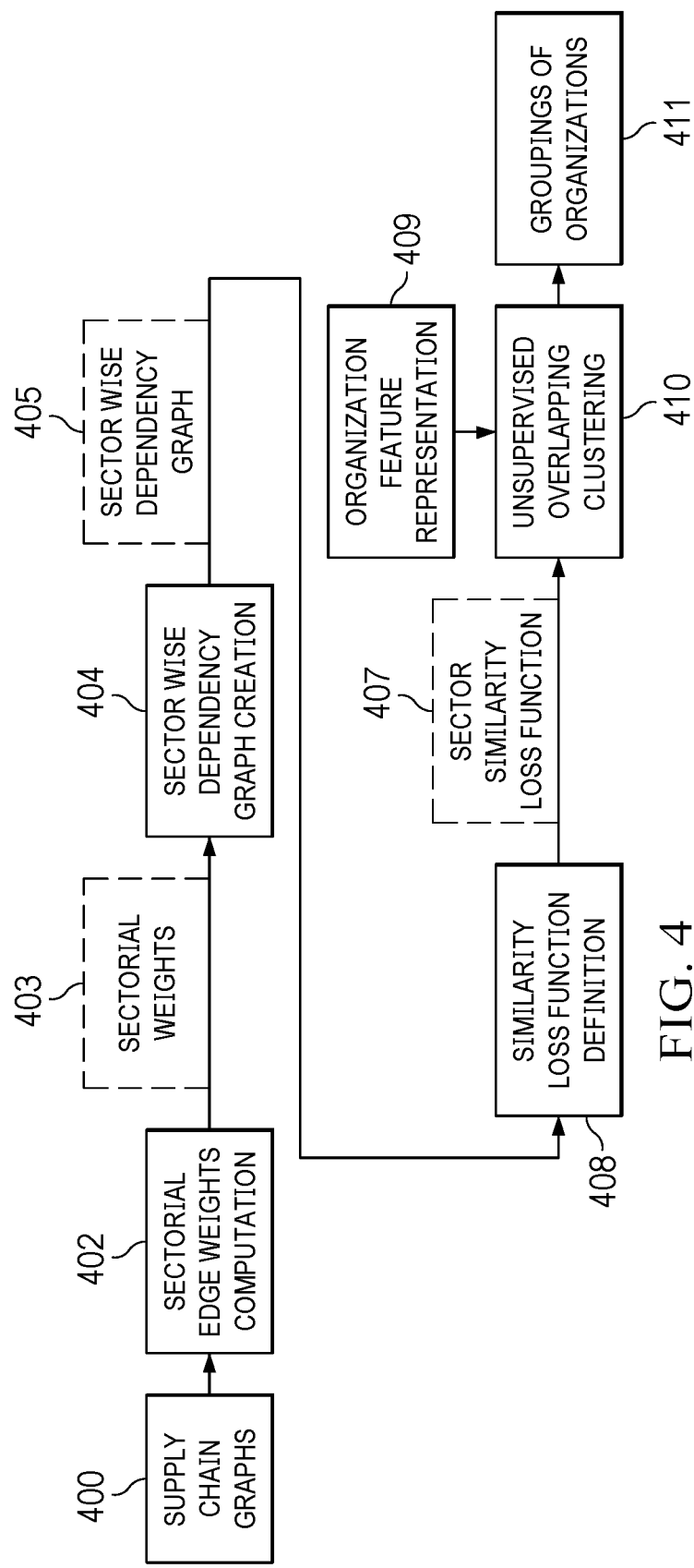
FIG. 4 is a data flow diagram for organization group identification in accordance with an illustrative embodiment.

Turning next to FIG. 4, a data flow diagram for organization group identification is depicted in accordance with an illustrative embodiment. This dataflow is example data flow that can be implemented in organization group identification 312 in FIG. 3.

As depicted, supply chain graphs 400 can be used by sectorial edge weights computation 402 to determine sectorial weights 403. In this example, supply chain graphs 400 are in identification of organizations and where those organizations are in a supply chain. Further, supply chain graphs 400 can also identify sectors for the supply chains. A sector can be, for example, manufacturing, transportation, energy, or other sectors.

Sectorial weights 403 are used in sector wise dependency graph creation 404 to generate sector wise dependency graph 405. The nodes in sector wise dependency graph creation 404 represent different sectors of operations for organization, while the edge weights denote the dependency between the source node and target node. For example, a sector can be one of oil and gas, fertilizer, chemical, agriculture, food, textile, and other sectors.

The sector wise dependency graph 405 can be used in determining the relation between different sectors. In this example, this relation can be defined in similarity loss function definition 408. Sectors which are closer to each other in the graph have higher dependency weights for sectorial weights have more similarity than sectors that are further away from each other in the graph with lower dependency weights for the sectorial weights.

A sector similarity loss function can be computed using a graph distance function on sector wise dependency graph:

$$L_{sector}(x_i, x_j) = \text{distance}_G(x_i^{sector}, x_j^{sector}),$$

where i is an index, j is an index, distances is distance between two nodes in a sector dependency graph, $x_i^{sector}$ is a sector at i, and $x_j^{sector}$ is a sector at j. The calculation can be made for the different pairs of sectors. An organization similarity loss can be computed using organization parameters:

$$L_{organization}(x_i, x_j) = \Sigma_{m \in M} d(x_i^m, x_j^m)$$

where d is distance metric, $x_i^{mo}$ is an organization parameter at i, $xj^m$ is the organization parameter at j, M is the set of organization parameters, such as geography and the number of employees. This calculation is made for all of the organization parameters in M.

Similarity loss function (L) 407 is defined as aggregate of $L_{sector}$ and $L_{organization}$. For example, similar to similarity loss L can be aggregated as follows:

$$L = (L_{sector} + L_{organization})/2$$

Similarity loss function L 407 provides an estimate of the similarity between pairs of organization parameters. The organization parameters $x_1$ and $x_2$, whose sectors are related and whose organization parameters are similar, have lower L and vice-versa.

Unsupervised overlapping clustering 410 can be performed using similarity loss function L 407 and organization feature representation 409 to obtain groupings of organizations 411. This type of clustering can allow organizations to belong to more than one group. In other illustrative examples, clustering can be performed without overlapping. This grouping can also cluster the organization of interest into a group of organizations in groupings of organizations 411.

Figure 5:
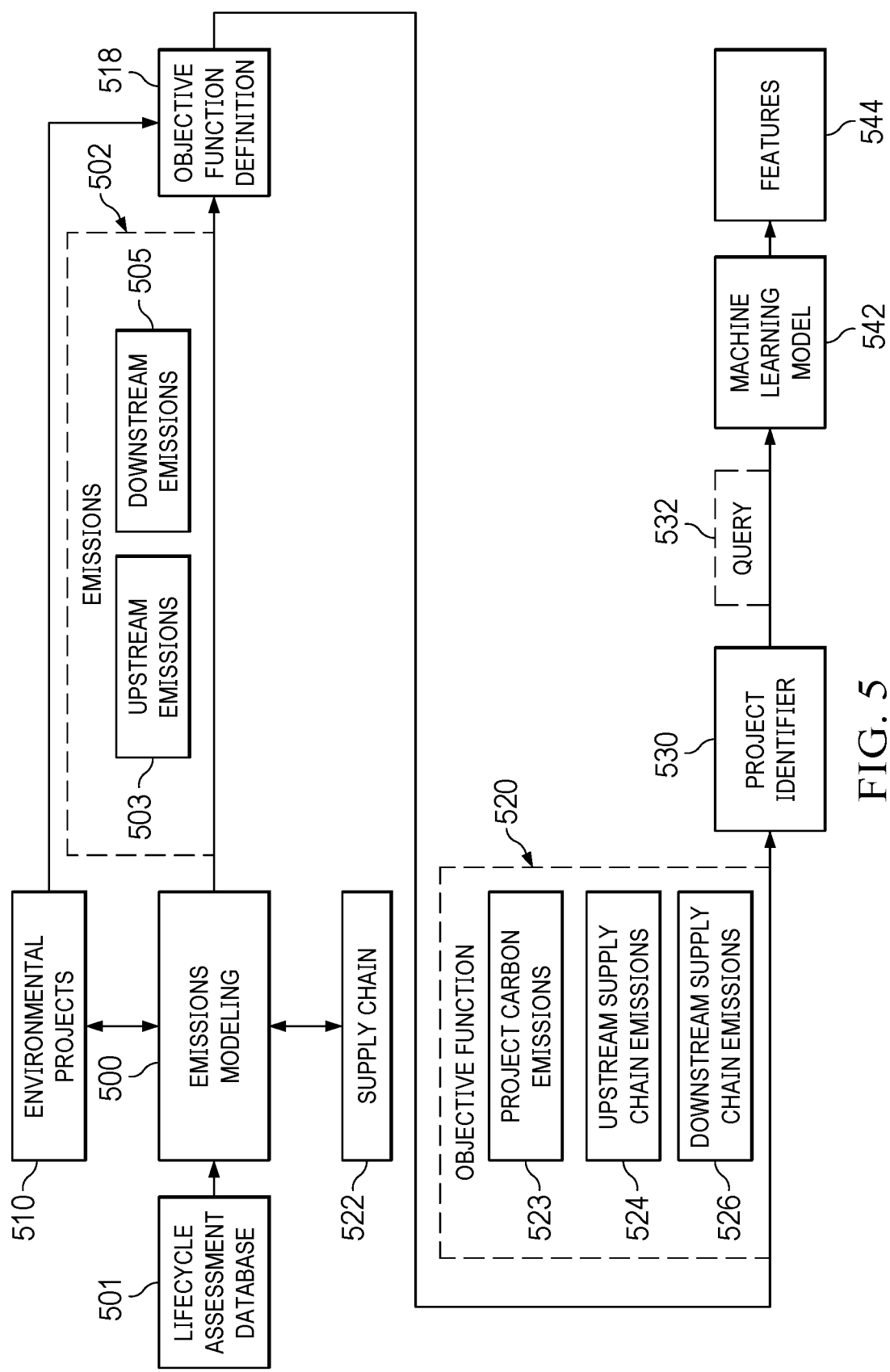
FIG. 5 is a dataflow diagram for determining impact assessment on a supply chain in accordance with an illustrative embodiment.

With reference next to FIG. 5, a dataflow diagram for determining impact assessment on a supply chain is depicted in accordance with an illustrative embodiment. In this illustrative example, the dataflow can be implemented in environmental analyzer 214 in FIG. 2. In this illustrative example, emissions modeling 500 is performed using lifecycle assessment (LCA) database 501. This database has emissions data for different activities.

In this example, emissions modeling 500 models emissions 502 for environmental projects 510 using lifecycle assessment database 501. In this example, environmental projects 510 are environmental projects that may be recommended to the organization of interest. These emissions include upstream emissions 503 and downstream emissions 505 in a supply chain for the organization of interest. Lifecycle assessment database 501 can be used to estimate upstream emissions 503 and downstream emissions 505 for the environmental projects. In another example, emissions modeling 500 can be performed using the machine learning model such as machine learning model 235 in FIG. 2 that has been trained to predict emissions from data such as that obtained from lifecycle assessment databases and other sources.

For example, fertilizer manufacturing can have known the emissions, such as carbon dioxide. Lifecycle assessment database 501 can be used to obtain information about carbon dioxide generation for fertilizer manufacturing. In this example, a look up of carbon generation for fertilizer manufacturing in lifecycle assessment database 501 can identify that a kilogram of fertilizer results in 100 grams of carbon dioxide to manufacture and can be different for different geographic locations. As a result, the purchase of a kilogram of fertilizer results in 100 grams of carbon dioxide as an emission that is associated with the company purchasing the fertilizer for use in manufacturing.

For example, an organization of interest may be a farm that purchases fertilizer for farming operations. Another company, a fertilizer manufacturer, that manufactures fertilizer is considered to be upstream in the supply chain in which the farm is located. In this example, environmental project the farm that affects how much fertilizer is used can have an effect upstream in the supply chain with respect to the fertilizer manufacture in the emissions generated by that fertilizer manufacturer.

For example, a candidate environmental project involving changes in farming operations and implementing water conservation can reduce the carbon dioxide for the farm by 3000 grams per month as compared to the current farming operations by the farm. However, this candidate project can result in an increase in fertilizer purchases by an additional 50 kilograms per month. With this example, the environmental project may result in a decrease in emissions by the farm but causes an increase in emissions by the fertilizer manufacture by 5000 grams of carbon dioxide per month. As result when taking into account upstream and downstream effects of the candidate project, an increase of 2000 grams per month of carbon emissions occurs within supply chain even though a reduction occurs for the farm. This type of environmental project may not be as desirable when taking into account the effects of the project on the supply chain.

In this illustrative example, the emissions data obtained from lifecycle assessment database 501 can also be based on different locations in which the activities occur. For example, the carbon dioxide emission per kilogram of fertilizer can be different for fertilizer produced in different locations or geographics.

Next, objective function definition 518 is performed to create objective function 520 for environmental projects 510. In this example, objective function 520 is supply chain aware. In other words, objective function 520 is a function that can be used minimize the impact on supply chain 522. In this example, objective function 520 takes into account impact of upstream emissions 503 and downstream emissions 505 on supply chain 522 for on environmental projects 510. Supply chain 522 is a supply chain in which the organization of interest is located.

In this example, objective function 520 is a cost function that includes project carbon emissions 523, upstream supply chain emissions 524, and downstream supply chain emissions 526. These different components can be implemented using terms in objective function 520.

For example, project carbon emissions 523 can include a number of different terms and objective function 520. Project carbon emissions 523 can include a diverse term that is used to determine how diverse projects are from each other.

The diversity can be maximized in this example in selecting projects. It is desirable to have diversity in projects that can be selected for implementation by the organization of interest.

Project carbon emissions 523 can also include a term identifying emissions based on the current projects of the organization of interest and operations that occur using the candidate environmental projects that may be recommended. It is desirable to have the candidate environmental projects that may be recommended be as close as possible to current projects implemented by that the organization of interest.

Additionally, identifying candidate environmental projects as close as possible to current projects used by the candidate organization can be taken into account in objective function 520. By identifying candidate environmental projects as close as possible to current projects Increases the potential that the candidate organization can implement the candidate environmental projects. As candidate environmental projects become increasingly different from current projects, implementing these candidate environmental projects may become less practical for the candidate organization. Thus, minimizing this term is desirable to identify candidate environmental projects that will improve the environmental performance of the organization of interest and also may be easier to implement. In this example, the terms for upstream supply chain emissions and downstream supply chain emissions can be created using emissions model from lifecycle assessment database 501.

Project identifier 530 can use the objective function 520 to generate query 532 for use to determine which ones of environmental projects to recommend through maximizing or minimizing objective function 520 environmental projects 510. In this example, counterfactual queries from objective function 520 can be identified for use in selecting environmental projects 510.

In one illustrative example, project identifier 530 can be used by machine learning model 542 to identify environmental projects 510. In this example, machine learning model 542 is trained by inputting a candidate solution into machine learning model 542 and evaluating the results against a portion of the training dataset. The cost can be an error score, often called the loss of the model. In this example, machine learning model 542 can be trained using previous recommendations of environmental projects and results of those environmental projects. This training can be also made with respect objective function 520.

In this example, machine learning model 542 can be trained to output activities for one or more of environmental projects 510 that minimize emissions in response to inputting current activities for current environmental projects for the organization of interest into machine learning model 542. Activities can be, for example, purchasing renewable energy, performing water conservation, reducing travel costs, or some other activity. The selection of the activities by machine learning model 542 can be based on meeting objective function 520 in a manner that minimizes emissions.

In this example, query 532 can be made to machine learning model 542 to identify which ones of environmental projects 510 to recommend to the organization of interest. In one example, query 532 comprises a set of features representing current activities of the candidate organization. These current activities can be for one or more current environmental projects implemented by the organization of interest.

In response to query 532, machine learning model 542 outputs features 544. These features are recommended activities that can be used for an environmental project. These features can correspond to one or more of environmental projects 510.

For example, a vector representation of features can be input into machine learning model 542. In one example, the vector can be purchasing 1 megawatt hour (Mwh) of renewable energy, $6,000 travel cost, and 1000 gallon water use in water conservation. The output can be another vector containing features 544 that comprise 10 megawatt hours of renewable energy, $6,000.00 travel cost. 1000 gallon water use. In this example, renewable energy purchase changes while the other features have not changed. As result, an environmental project can be recommended with respect to purchasing 10 megawatt hours of renewable energy per month.

In one illustrative example, one or more solutions are present that overcome a problem with recommending environmental projects to organizations. As a result, one or more solutions can enable identifying environmental projects for organizations using environmental data and organization parameters for organizations related to an organization of interest which an evaluation is being made to recommend environmental projects. Additionally, the recommendation of environmental projects can also take into account the impact of those environmental projects on the supply chain in which the organization of interest is located. As a result, environmental projects can be recommended for organizations and those projects can also be selected in a manner that reduces the impact of the projects on the organization of interest and on organizations within the supply chain.

In the illustrative example, the use of environmental analyzer 214 in computer system 212 integrates processes into a practical application for method recommending environmental projects. In other words, environmental analyzer 214 in computer system 212 is directed to a practical application of processes integrated into environmental analyzer 214 in computer system 212 that identifies a group from groups of organizations for an organization of interest; determines environmental performance for the organizations in the group; and identifies environmental projects for the organization of interest based on the environmental performance determined for the organizations in the group. Further, the identification of environmental projects can also take into account impacts on supply chain in which the organization of interest is located.

The illustration of environmental project environment 200 in the different components and data flows FIGS. 2-5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 6:
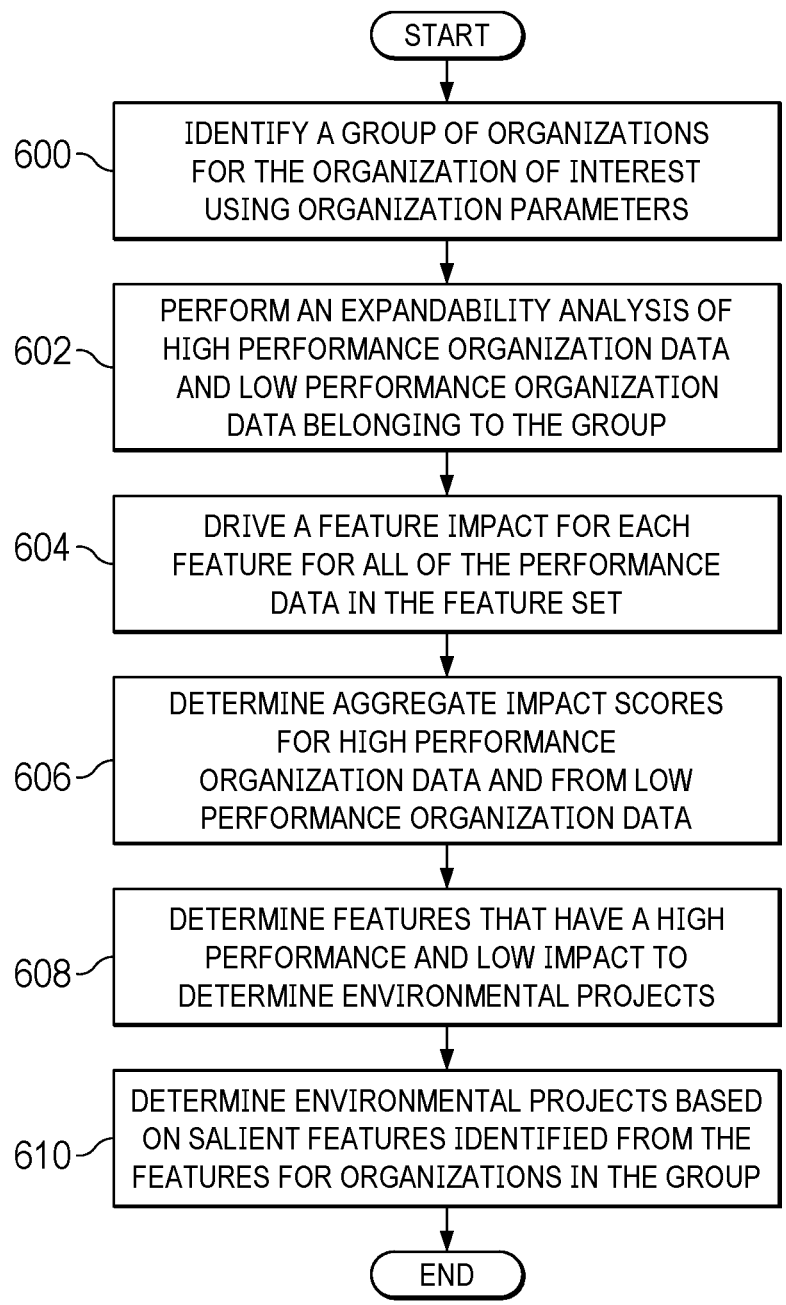
FIG. 6 is a flowchart of a process for identifying environmental projects for an organization in accordance with an illustrative embodiment.

Turning next to FIG. 6, a flowchart of a process for identifying environmental projects for an organization is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in environmental analyzer 214 in computer system 212 in FIG. 2.

The process begins by identifying a group of organizations for the organization of interest using organization parameters (step 600). In step 600, the group of organizations is identified from groups of organizations that have been created from analyzing organization parameters for those organizations.

The process performs an expandability analysis of high performance organization data and low performance organization data belonging to the group (step 602). In step 602, the environmental performance data can be obtained from predictions of emissions for the organizations in the group. Step 602 can also use historical data for organization in the group. The analysis can include comparing the emission and associated parameters for the organization such as weather, asset age, electrical usage. These parameters can be part of organization feature representation 310 in FIG. 3.

The high performance organization data and the low performance organization data indicate environmental performance for the organizations within the group. The high performance organization data can be data that needs a threshold. For example, threshold can be a net zero for carbon. Environmental performance data meeting or exceeding the threshold can be considered high performance organization data. Environmental performance data less than the threshold can be identified as low performance organization data.

In one illustrative example, companies with high use of renewable energy have a higher environmental performance. This higher environmental performance is a lower carbon emission as compared to companies that have a lower use of renewable energy.

The process drives a feature impact for each feature for all of the performance data in the feature set (step 604). In step 604, the process derives feature impact $I_{Fi}$ for feature $Fi \in F$ for all the data in C, where F is the feature set. In this example, the feature impact $I_{Fi}$ for feature Fi in the feature set F can be determined for all of the performance data. A feature can be, for example, renewable energy, travel cost, or other features. This step can determine what features are important or not important to the organizations in the group identified for the organization of interest.

The process determines aggregate impact scores for high performance organization data and from low performance organization data (step 606). In step 606, the process can compute aggregate impact scores $I_{Fi}^{H}$ for high performance organization data and $I_{Fi}^{L}$ for low performance organization data.

The process determines features that have a high performance and a low impact to determine environmental projects (step 608). In step 608, the process can determine salient features $S \sqsubset F$ which have high $I_s^{H}$ and low $I_s^{L}$ to identify environmental projects using subgroup analysis. The subgroup analysis can break down the features into subsets of features based on shared characteristics.

The process determines environmental projects based on salient features identified from the features for organizations in the group (step 610). The process terminates thereafter. In step 610, a project can be derived from a feature that has a high performance organization data and has a high impact score. In this example, the impact score indicates the effect of the feature on the environmental performance.

For example, renewable energy can be a salient feature that results in a higher environmental performance such as reducing carbon emissions as compared to the other features that are analyzed. Based on this feature, the environmental project based on the salient feature can be to purchase a selected amount of renewable energy. The amount of renewable energy can be based on the amounts of renewable energy purchased by other organizations in the group and the effect of those purchases on environmental performance or those organizations.

Figure 7:
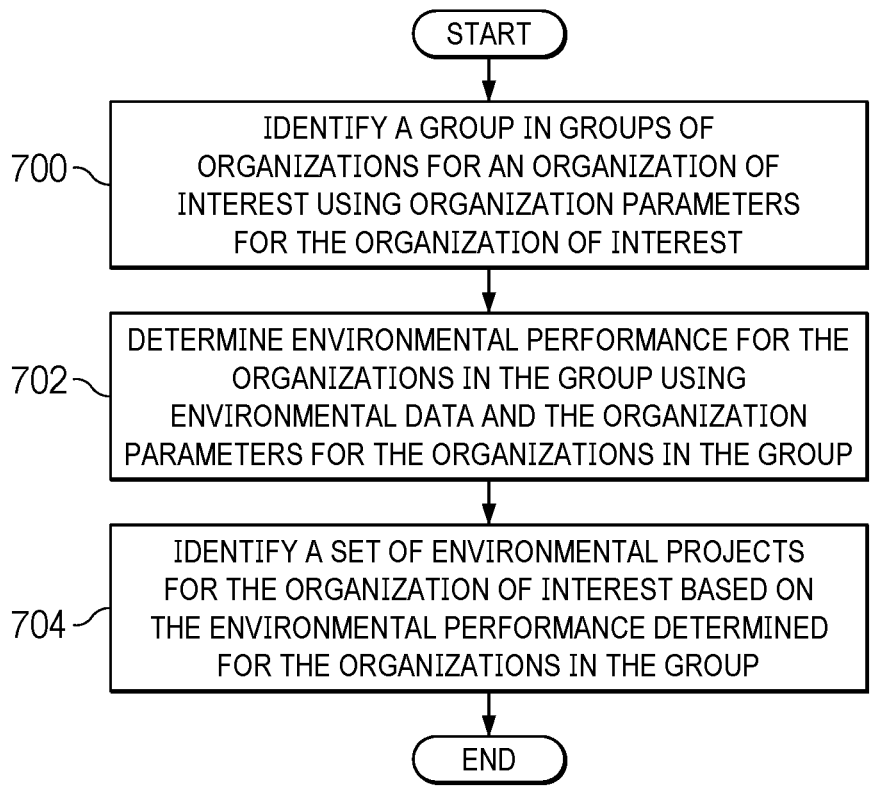
FIG. 7 is a flowchart of a process for identifying environmental projects for an organization in accordance with an illustrative embodiment.

With reference next to FIG. 7, a flowchart of a process for identifying environmental projects for an organization is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in environmental analyzer 214 in computer system 212 in FIG. 2.

The process begins by identifying a group in groups of organizations for an organization of interest using organization parameters for the organization of interest (step 700). The process determines environmental performance for the organizations in the group using environmental data and the organization parameters for the organizations in the group (step 702).

The process identifies a set of environmental projects for the organization of interest based on the environmental performance determined for the organizations in the group (step 704). The process terminates thereafter.

Figure 8:
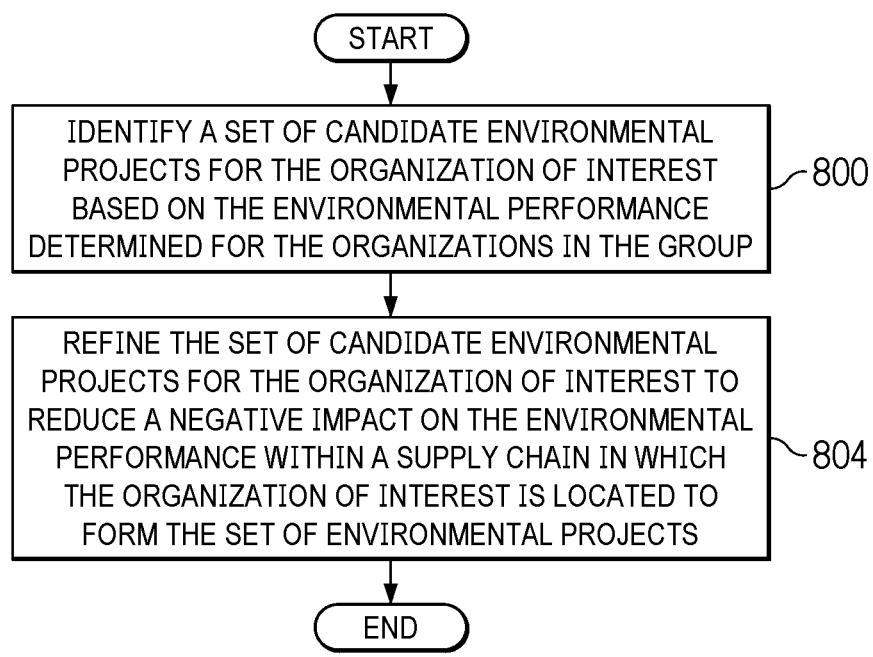
FIG. 8 is a flowchart of a process for identifying a set of environmental projects in accordance with an illustrative embodiment.

With reference next to FIG. 8, a flowchart of a process for identifying a set of environmental projects is depicted in accordance with an illustrative embodiment. The process illustrated in this figure is an example of step 704 in FIG. 7.

The process identifies a set of candidate environmental projects for the organization of interest based on the environmental performance determined for the organizations in the group (step 800). The process refines the set of candidate environmental projects for the organization of interest to reduce a negative impact on the environmental performance within a supply chain in which the organization of interest is located to form to form the set of environmental projects (step 802). The process terminates thereafter. In this manner, the selection of the set of environmental projects or recommendation to the organization of interest can be made taking into account the effects of environmental projects find the supply chain in which the organization of interest is located.

Figure 9:
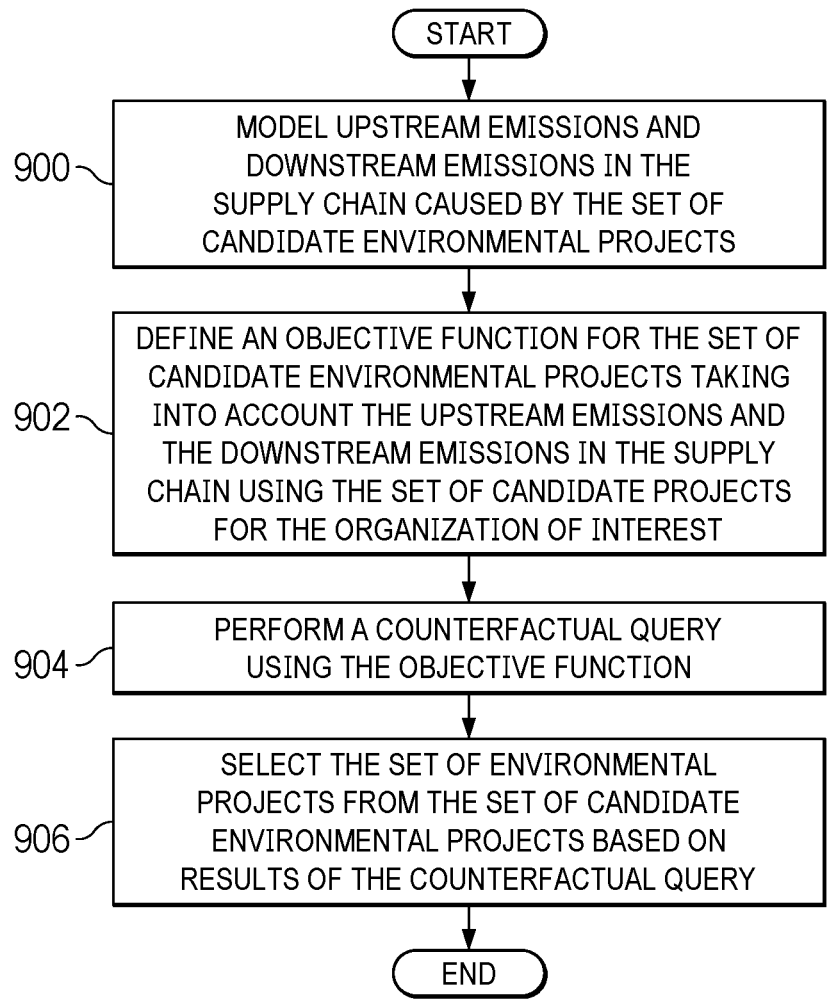
FIG. 9 is a flowchart of process for refining a set of candidate processes in accordance with an illustrative embodiment.

Next in FIG. 9, a flowchart of process for refining a set of candidate processes is depicted in accordance with an illustrative embodiment. The process illustrated in this figure is an example of an implementation for step 802 in FIG. 8.

The process models upstream emissions and downstream emissions in the supply chain caused by the set of candidate environmental projects (step 900). The process defines an objective function for the set of candidate environmental projects taking into account the upstream emissions and the downstream emissions in the supply chain using the set of candidate environmental projects for the organization of interest (step 902). The process performs a counterfactual query using the objective function (step 904).

The process selects the set of environmental projects from the set of candidate environmental projects based on results of the counterfactual query (step 906). The process terminates thereafter. In some illustrative examples, the set of environmental projects can be selected from modifications made to the set of candidate environmental projects. In other words, a candidate environmental project can be selected and modifications be made based on the impact on the supply chain. For example, a candidate environmental project may be for purchase of X amount of renewable energy on a yearly basis. This candidate environmental project can be selected with a modification that the purchase of renewable energy on a yearly basis is Y amount.

Figure 10:
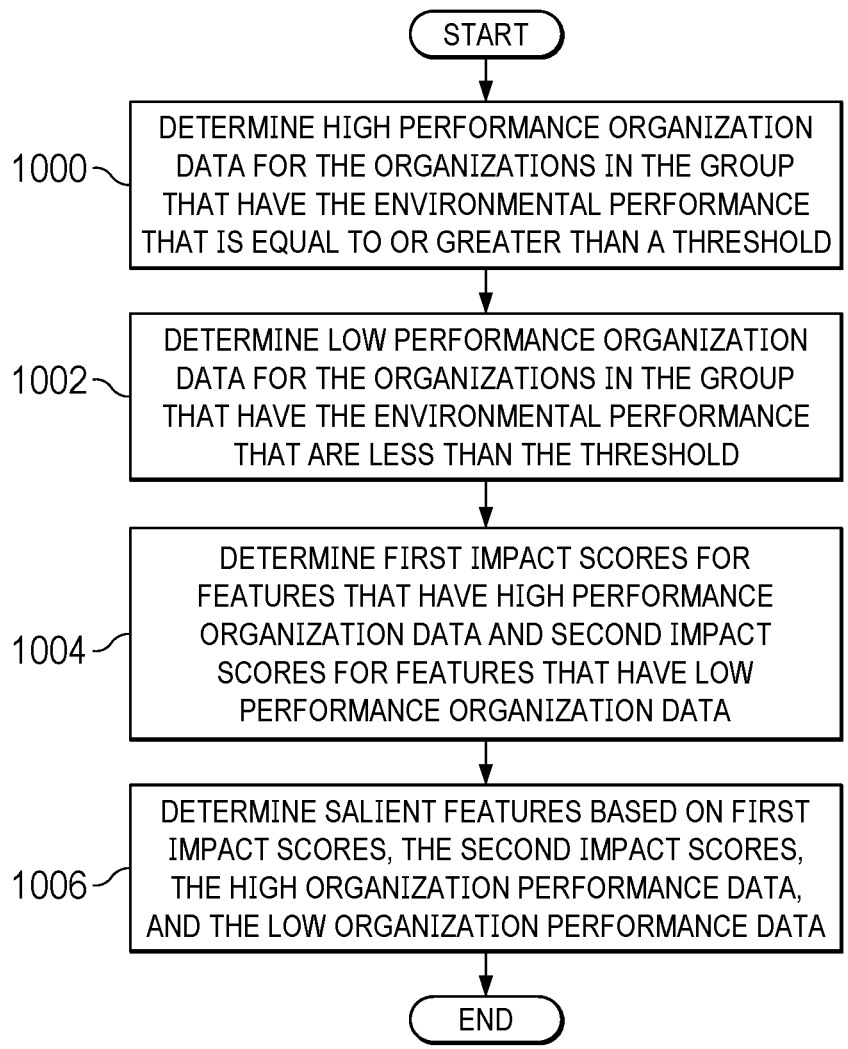
FIG. 10 is a flowchart of a process for determining environmental performance for organizations in a group in accordance with an illustrative embodiment.

Turning now to FIG. 10, a flowchart of a process for determining environmental performance for organizations in a group is depicted in accordance with an illustrative embodiment. The process illustrated in FIG. 10 is an example of an implementation for step 702 in FIG. 7. This process can be used to determine environmental performance for features in organizations. These features can be assets or processes in the organizations. For example, a feature can be a server computer, a refrigeration unit, a lithography machine, a fertilization manufacturing process, or some other suitable feature.

The process begins by determining high performance organization data for the organizations in the group that have the environmental performance that is equal to or greater than a threshold (step 1000). In this example, high performance organization data can be, for example, performance data for organizations in which the environmental performance indicates carbon neutrality or a net zero carbon emission for those organizations.

The process determines low performance organization data for the organizations in the group that have the environmental performance that are less than the threshold (step 1002). Low performance organization data can be performance data for organizations that have a lower level ordinance in response not using renewable energy.

The process determines first impact scores for features that have high performance organization data and second impact scores for features that have low performance organization data (step 1004). In step 1004, a determination is made for the impact of features for organizations with high performance organization data and organizations with low performance organization data.

Thus, impact scores can be identified for each feature for both high performance organization data and low performance organization data. For example, a feature can be renewable energy purchases. The impact scores for this feature are calculated for organizations with high performance organization data and organizations with low performance organization data. This determination can be made to identify features that have a high impact on reducing emissions for high environmental performance.

The process determines salient features based on first impact scores, the second impact scores, the high organization performance data, and the low organization performance data (step 1006). The process terminates thereafter. In this example, features that have low impact scores and low environmental performance can be excluded from consideration as salient features. Features with high impact scores and high environmental performance can be selected as salient features that are used to create environmental projects. A feature with low impact and low performance organization data may not be selected.

For example, with water conservation that has low performance has a low impact for the organization. As a result, using this feature may not help increase the performance of organizations with low organization performance data because of the low impact of this feature. As another example, a feature can be renewable energy. With renewable energy, a determination that renewable energy has a high impact can be used to select that feature as a salient feature to create an environmental project to purchase renewable energy.

Figure 11:
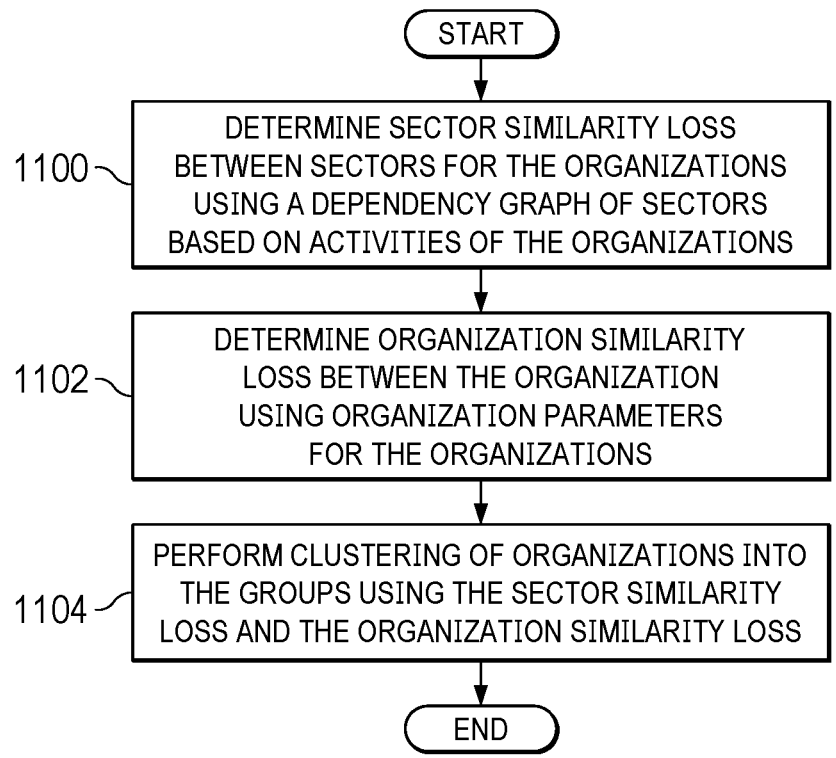
FIG. 11 is a flowchart of a process for grouping organizations in accordance with an illustrative embodiment.

Turning now to FIG. 11, a flowchart of a process for grouping organizations is depicted in accordance with an illustrative embodiment. The process in FIG. 11 is an example of one implementation for step 700 in FIG. 7.

The process begins by determining sector similarity loss between sectors for the organizations using a dependency graph of sectors based on activities of the organizations (step 1100). In step 1100, edges between nodes in the pendency graph of sectors have edge weights that indicate dependencies between the nodes connected by the edges.

The process determines organization similarity loss between the organization using organization parameters for the organizations (step 1102). The process performs clustering of organizations into the groups using the sector similarity loss and the organization similarity loss (step 1104). The process terminates thereafter.

Figure 12:
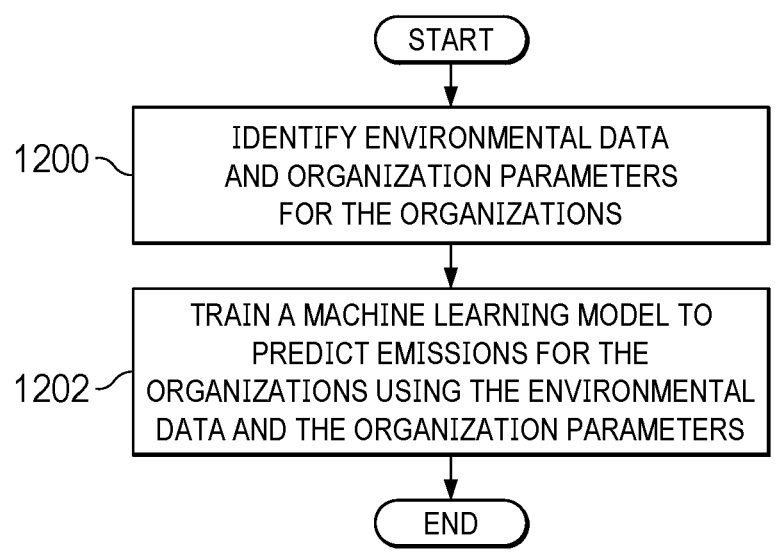
FIG. 12 is a flowchart of a process for training machine learning model in accordance with an illustrative embodiment.

With reference to FIG. 12, a flowchart of a process for training machine learning model is depicted in accordance with an illustrative embodiment. The process illustrated in FIG. 12 is an example of additional steps that can be performed with the steps in FIG. 7.

The process identifies environmental data and organization parameters for the organizations (step 1200). The process trains a machine learning model to predict emissions for the organizations using the environmental data and the organization parameters (step 1202). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
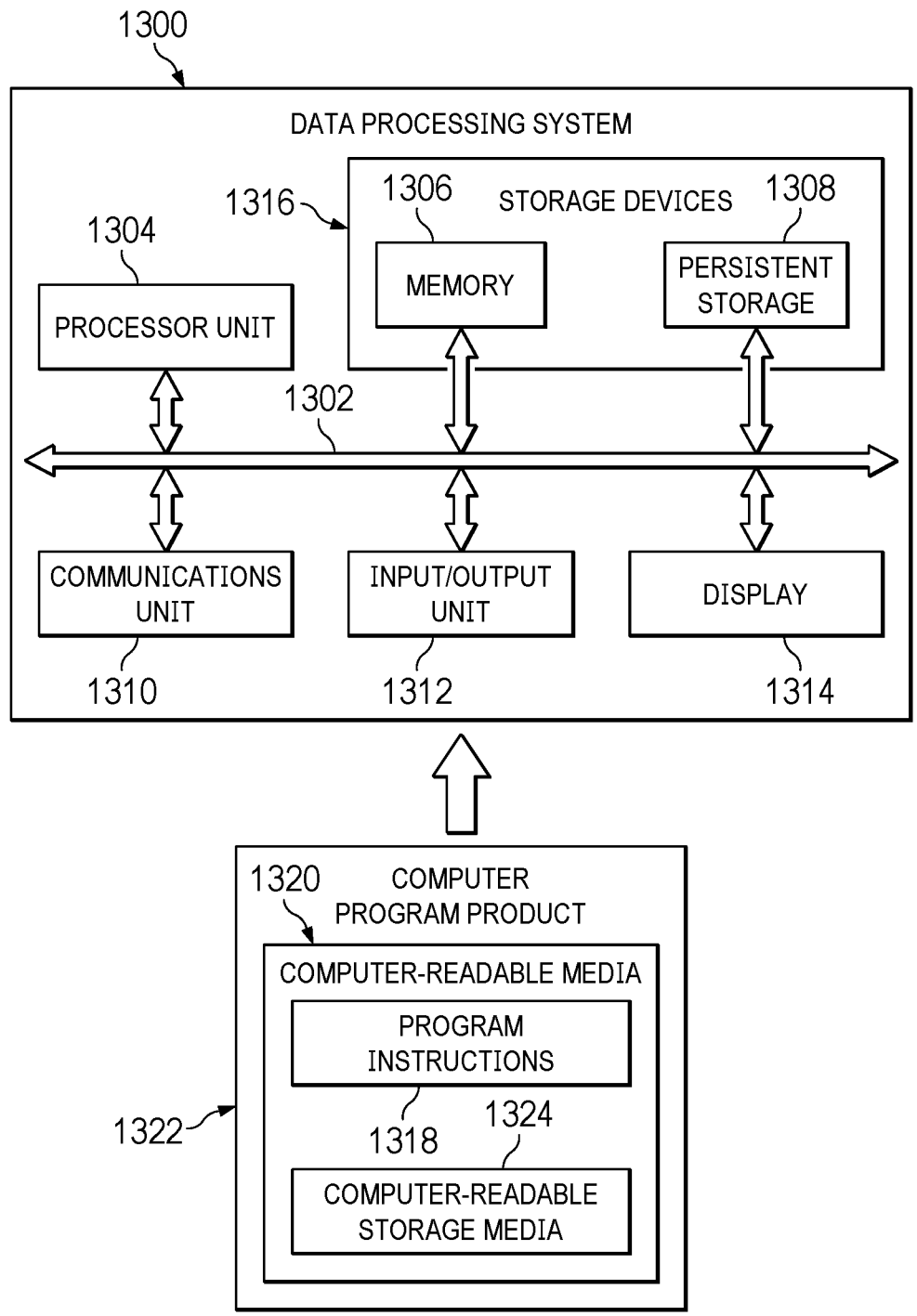
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement computers and computing devices in computing environment 100 in FIG. 1. Data processing system 1300 can also be used to implement computer system 212 in FIG. 2. In this illustrative example, data processing system 1300 includes communications framework 1302, which provides communications between processor unit 1304, memory 1306, persistent storage 1308, communications unit 1310, input/output (I/O) unit 1312, and display

1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1316 may also be referred to as computer readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program instructions, computer usable program instructions, or computer readable program instructions that can be read and executed by a processor in processor unit 1304. The program instructions in the different embodiments can be embodied on different physical or computer readable storage media, such as memory 1306 or persistent storage 1308.

Program instructions 1318 are located in a functional form on computer readable media 1320 that is selectively removable and can be loaded onto or transferred to data processing system 1300 for execution by processor unit 1304. Program instructions 1318 and computer readable media 1320 form computer program product 1322 in these illustrative examples. In the illustrative example, computer readable media 1320 is computer readable storage media 1324.

Computer readable storage media 1324 is a physical or tangible storage device used to store program instructions 1318 rather than a medium that propagates or transmits program instructions 1318. Computer readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1318 can be transferred to data processing system 1300 using a computer readable signal media. The computer readable signal media are signals and can be, for example, a propagated data signal containing program instructions 1318. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1320" can be singular or plural. For example, program instructions 1318 can be located in computer readable media 1320 in the form of a single storage device or system. In another example, program instructions 1318 can be located in computer readable media 1320 that is distributed in multiple data processing systems. In other words, some instructions in program instructions 1318 can be located in one data processing system while other instructions in program instructions 1318 can be located in one data processing system. For example, a portion of program instructions 1318 can be located in computer readable media 1320 in a server computer while another portion of program instructions 1318 can be located in computer readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program instructions 1318.

Thus, illustrative embodiments provide a computer implemented method, computer system, and computer program product for identifying a set of environmental projects. A number of processor units identifies a group in a plurality of groups for organization of interest using organization parameters for the organization of interest. The number of processor units determines environmental performance for the organizations in the group using environmental data and the organization parameters for the organizations in the group. The number of processor units identifies the set of environmental projects for the organization of interest based on the environmental performance determined for the organizations in the group.

Additionally, the identification of the set of environmental projects can also include taking into account the impact of these projects on upstream emissions and downstream emissions in the supply chain in which the organization of interest is located.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method comprising:
identifying, by a number of processor units, environmental data and organization parameters for organizations;
training, by the number of processor units, a machine learning model to predict emissions for the organizations using the environmental data and the organization parameters;
predicting, by the machine learning model, the emissions for the organizations;
identifying, by the number of processor units and an environmental analyzer, a group in groups of organizations for an organization of interest using organization parameters for the organization of interest;
determining, by the number of processor units and the environmental analyzer, environmental performance for the organizations in the group using the emissions predicted for the organizations in the group;
training, by the number of processor units, another machine learning model using previous recommendations of previous environmental projects as training data;
identifying, by the another machine learning model, a set of environmental projects for the organization of interest based on the environmental performance determined for the organizations in the group;
determining, by the number of processor units and the environmental analyzer, sector similarity loss between sectors for the organizations using a dependency graph of sectors based on activities of the organizations, wherein edges between nodes in the dependency graph of sectors have edge weights that indicate dependencies between the nodes connected by the edges;
determining, by the number of processor units and the environmental analyzer, organization similarity loss between the organization using organization parameters for the organizations;
clustering of organizations, by the number of processor units and the environmental analyzer, into the groups of organizations using a clustering machine learning model, the sector similarity loss and the organization similarity loss;
recommending, by the number of processor units and the environmental analyzer, in response to clustering the organizations into the groups of organizations, environmental projects; and
purchasing, by the number of processor units, in response to recommending environmental projects, a selected amount of renewable energy, wherein identifying, by the number of processor units, the set of environmental projects for the organization of interest comprises:
identifying, by the number of processor units, a set of candidate environmental projects for the organization of interest based on the environmental performance determined for the organizations in the group; and
refining, by the number of processor units, the set of candidate environmental projects for the organization of interest to reduce a negative impact on the environmental performance within a supply chain in which the organization of interest is located to form to form the set of environmental projects, wherein refining, by the number of processor units, the set of candidate environmental projects comprises:
modeling, by the machine learning model, upstream emissions and downstream emissions in the supply chain caused by the set of candidate environmental projects;
defining, by the number of processor units, an objective function for the set of candidate environmental projects taking into account the upstream emissions and the downstream emissions in the supply chain using the set of candidate environmental projects for the organization of interest;
performing, by the number of processor units, a counterfactual query using the objective function; and
selecting, by the another machine learning model, the set of environmental projects from the set of candidate environmental projects based on results of the counterfactual query.

2. The computer implemented method of claim 1, wherein determining, by the number of processor units, the environmental performance for the organizations in the group comprises:
determining, by the number of processor units, high performance organization data for the organizations in the group that have the environmental performance that is equal to or greater than a threshold;
determining, by the number of processor units, low performance organization data for the organizations in the group that have the environmental performance that are less than the threshold;
determining, by the number of processor units, first impact scores for features that have high performance organization data and second impact scores for features that have low performance organization data; and determining, by the number of processor units, features based on first impact scores, the second impact scores, the high organization performance data, and the low organization performance data.

3. The computer implemented method of claim 1, wherein identifying, by the number of processor units, the set of environmental projects for the organization of interest comprises:

identifying, by the number of processor units, the set of environmental projects for the organization of interest based on the environmental performance determined for the organizations in the group and constraints for the organization of interest.

4. The computer implemented method of claim 1, wherein the environmental data comprises at least one of greenhouse gas emissions, conservation projects, cost avoidance projects, or renewable energy projects.

5. The computer implemented method of claim 1, wherein clustering of organizations into the groups of organization using the machine learning model, the sector similarity loss and the organization similarity loss comprises unsupervised overlapping clustering using a similarity loss function (L) defined as an aggregate of $L_{sector}$ and $L_{organization}$ that provides an estimate of similarity between pairs of organization parameters.

6. A computer system comprising:
a number of processor units that execute program instructions to:
identify environmental data and organization parameters for organizations;
train a machine learning model to predict emissions for the organizations using the environmental data and the organization parameters;
predict the emissions for the organizations by the machine learning model;
identify a group in groups of organizations for an organization of interest using organization parameters for the organization of interest;
determine environmental performance for the organizations in the group using the emissions predicted for the organizations in the group;
train another machine learning model using previous recommendations of previous environmental projects as training data;
identify, by the another machine learning model, a set of environmental projects for the organization of interest based on the environmental performance determined for the organizations in the group;
determine sector similarity loss between sectors for the organizations using a dependency graph of sectors based on activities of the organizations, wherein edges between nodes in the dependency graph of sectors have edge weights that indicate dependencies between the nodes connected by the edges;
determine organization similarity loss between the organization using organization parameters for the organizations;
cluster organizations into the groups using a clustering machine learning model, the sector similarity loss and the organization similarity loss;
recommending, by the number of processor units and the environmental analyzer, in response to clustering the organizations into the groups of organizations, environmental projects; and
purchasing, by the number of processor units, in response to recommending environmental projects, a selected amount of renewable energy, wherein in identifying the set of environmental projects for the organization of interest, the number of processor units executes program instructions to:
identify a set of candidate environmental projects for the organization of interest based on the environmental performance determined for the organizations in the group; and
refine the set of candidate environmental projects for the organization of interest to reduce a negative impact on the environmental performance within a supply chain in which the organization of interest is located to form to form the set of environmental projects, wherein in refining the set of candidate environmental projects, the number of processor units executes program instructions to:
model, by the machine learning model, upstream emissions and downstream emissions in the supply chain caused by the set of candidate environmental projects;
define an objective function for the set of candidate environmental projects taking into account the upstream emissions and the downstream emissions in the supply chain using the set of candidate environmental projects for the organization of interest;
perform a counterfactual query using the objective function; and
select, by the another machine learning model, the set of environmental projects from the set of candidate environmental projects based on results of the counterfactual query.

7. The computer system of claim 6, wherein in determining the environmental performance for the organizations in the group, the number of processor units executes program instructions to:
determine high performance organization data for the organizations in the group that have the environmental performance that is equal to or greater than a threshold;
determine low performance organization data for the organizations in the group that have the environmental performance that are less than the threshold;
determine first impact scores for features that have high performance organization data and second impact scores for features that have low performance organization data; and
determine features based on first impact scores, the second impact scores, the high organization performance data, and the low organization performance data.

8. The computer system of claim 6, wherein in identifying the set of environmental projects for the organization of interest, the number of processor units executes program instructions to:
identify the set of environmental projects for the organization of interest based on the environmental performance determined for the organizations in the group and constraints for the organization of interest.

9. The computer system of claim 6, wherein the environmental data comprises at least one of greenhouse gas emissions, conservation projects, cost avoidance projects, or renewable energy projects.

10. The computer system of claim 6, wherein in clustering of organizations into the groups of organization using the machine learning model, the sector similarity loss and the organization similarity loss, the number of processor units executes program instructions to:

cluster using unsupervised overlapping clustering using a similarity loss function (L) defined as an aggregate of $L_{sector}$ and $L_{organization}$ that provides an estimate of similarity between pairs of organization parameters.

11. A computer program product comprising a computer readable storage medium having program instructions embodied therewith, the program instructions executable by a computer system to cause the computer system to perform a method of:

identifying, by a number of processor units, environmental data and organization parameters for organizations;

training, by the number of processor units, a machine learning model to predict emissions for the organizations using the environmental data and the organization parameters;

predicting, by the machine learning model, the emissions for the organizations;

identifying, by the number of processor units and an environmental analyzer, a group in groups of organizations for an organization of interest using organization parameters for the organization of interest;

determining, by the number of processor units and the environmental analyzer, environmental performance for the organizations in the group using the emissions predicted for the organizations in the group;

training, by the number of processor units, another machine learning model using previous recommendations of previous environmental projects as training data;

identifying, by the another machine learning model, a set of environmental projects for the organization of interest based on the environmental performance determined for the organizations in the group;

determining, by the number of processor units and the environmental analyzer, sector similarity loss between sectors for the organizations using a dependency graph of sectors based on activities of the organizations, wherein edges between nodes in the dependency graph of sectors have edge weights that indicate dependencies between the nodes connected by the edges;

determining, by the number of processor units and the environmental analyzer, organization similarity loss between the organization using organization parameters for the organizations;

clustering of organizations, by the number of processor units and the environmental analyzer, into the groups of organizations using a clustering machine learning model, the sector similarity loss and the organization similarity loss;

recommending, by the number of processor units and the environmental analyzer, in response to clustering the organizations into the groups of organizations, environmental projects; and purchasing, by the number of processor units, in response to recommending environmental projects, a selected amount of renewable energy, wherein identifying the set of environmental projects for the organization of interest comprises:

identifying a set of candidate environmental projects for the organization of interest based on the environmental performance determined for the organizations in the group; and refining the set of candidate environmental projects for the organization of interest to reduce a negative impact on the environmental performance within a supply chain in which the organization of interest is located to form to form the set of environmental projects, wherein refining the set of candidate environmental projects comprises:

modeling, by the machine learning model, upstream emissions and downstream emissions in the supply chain caused by the set of candidate environmental projects;

defining an objective function for the set of candidate environmental projects taking into account the upstream emissions and the downstream emissions in the supply chain using the set of candidate environmental projects for the organization of interest;

performing a counterfactual query using the objective function; and selecting, by the another machine learning model, the set of environmental projects from the set of candidate environmental projects based on results of the counterfactual query.

12. The computer program product of claim 11, wherein determining the environmental performance for the organizations in the group comprises:

determining high performance organization data for the organizations in the group that have the environmental performance that is equal to or greater than a threshold;

determining low performance organization data for the organizations in the group that have the environmental performance that are less than the threshold;

determining first impact scores for features that have high performance organization data and second impact scores for features that have low performance organization data; and determining features based on first impact scores, the second impact scores, the high organization performance data, and the low organization performance data.

* * * * *